Patented Oct. 29, 1929

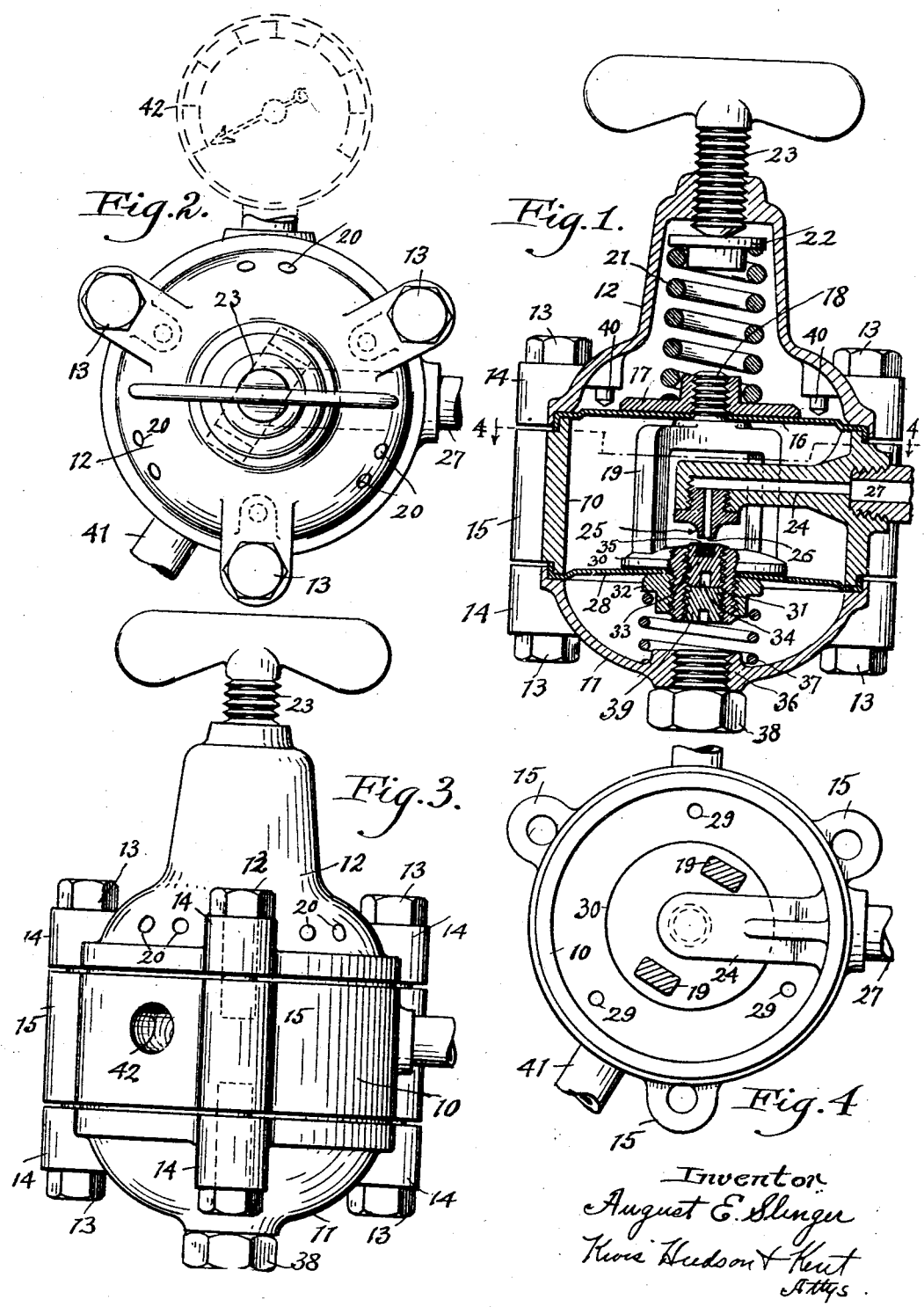

1,733,432

UNITED STATES PATENT OFFICE

AUGUST E. SLINGER, OF CLEVELAND, OHIO, ASSIGNOR TO TORCHPARTS GAS APPLIANCE COMPANY, OF CLEVELAND, OHIO, A CORPORATION OF DELAWARE

REGULATOR VALVE

Application filed January 12, 1927. Serial No. 160,540.

This invention relates to pressure-regulating devices and more particularly to valves for reducing the high pressure of gases contained in storage tanks, in which they are transported, to a lower working pressure.

It is one of the objects of the invention to provide a pressure-regulating valve that will have an improved form of safety device for automatically releasing the gas from the valve in case there is a failure to properly function and an abnormally high pressure accumulates in the low pressure chamber of the valve.

Another object of the invention is to provide a device of the kind referred to in which the valve for controlling the flow of the high pressure gas to the low pressure chamber is so supported and guided that it will properly register with its seat, at all times.

A further object of the invention is to provide an improved form of construction that will be comparatively simple and inexpensive to manufacture and which will be reliable in its operation and in which the regulating movements of the control valve are not liable to be interfered with by accumulations of "frost" on the working parts.

Other objects of the invention and the features of novelty will be apparent from the following description, taken in connection with the accompanying drawings, of which:

Fig. 1 is a longitudinal section through a regulator embodying my invention;

Fig. 2 is a plan view thereof;

Fig. 3 is a side elevation; and

Fig. 4 is a section on the line 4—4 of Fig. 1.

Referring to the drawings, the casing of the valve comprises the central section 10 and the end sections 11 and 12. These sections are secured together by cap screws 13, which extend through ears 14 on the sections 11 and 12, and are threaded into lugs 15 on the section 10. Clamped between the sections 10 and 12, there is a flexible sheet metal diaphragm 16, on the upper side of which there is a centrally arranged reinforcing disk 17 which is secured to the diphragm by means of the threaded stud 18 on a yoke 19, the central portion of the diaphragm 16 being clamped between the disk 17 and the yoke 19, as will be seen from Fig. 1. The casing section 12 is provided with openings 20 for the purpose of opening the interior of this section to atmospheric pressure. A spring 21 is arranged within the casing section 12, between the disk 17 and the button 22. A regulating screw 23 engages the button 22 and the tension of the spring 21 may be regulated by the screw 23.

A conduit 24, for the high pressure gas, extends into the casing section 10 and has screwed into its inner end a nozzle 25, at the tip of which there is a valve seat 26. A pipe is shown at 27 and this pipe extends to the source of supply of high pressure gas.

A flexible sheet metal diaphragm 28 has its periphery clamped between the casing sections 10 and 11 and is provided with perforations 29 for the purpose of equalizing the pressure on the opposite sides of the diaphragm. The lower end of the yoke 19 has a disk 30, preferably made integral therewith and which engages the upper side of the diaphragm 28. The disk 30 has a tubular extension 31 which is internally and exteriorly threaded and a nut 32 is arranged on the external threads for the purpose of clamping the diaphragm 28 against the disk 30. A plug 33 is screwed into the extension 31 and has a screw-driver slot 34 by means of which it may be adjusted. The exposed end of the plug 33 has a recess in which there is arranged a slug 35, which acts as a valve for cooperation with the seat 26.

The outer end of the casing section 11 has a boss 36 and a spring 37 surrounds this boss and the nut 32 and normally opposes the spring 21. There is a threaded opening in the boss 36 which is closed by the plug 38.

The plug 33 is locked in position by a plug 39 and, by removing the plug 38, the plugs 33 and 39 may be reached by a screw-driver for the purpose of removing or adjusting them.

Secured within the casing section 12, there are spikes 40 which have their points located adjacent to the diaphragm 16 and radially outward from the disk 17.

In the operation of the regulator, the high pressure gas flows through the conduit 24 and the nozzle 25 into the casing section 10 and the pressure within the chamber, below the diaphragm 16, acts on this diaphragm to overcome the tension of the spring 21 and lifts the yoke 19, which moves the valve 35 toward the seat 26 until the desired pressure is obtained in the low pressure chamber below the diaphragm 16. The pressure at which the valve 35 will be brought into contact with the seat 26 and thus shut off the flow of high pressure gas, is determined by the tension of the spring 21 which, as before stated, may be adjusted by means of the screw 23. The spring 37 acts with the pressure on the under side of the diaphragm 16 in closing the valve 35.

The low pressure gas is discharged from the interior of the casing by means of a pipe 41, which is connected to the opening 42 in the casing section 10.

If, at any time, the valve 35 fails to close at the proper pressure, with the result that an abnormally high pressure accumulates below the diaphragm 16, this abnormally high pressure will produce an abnormal deflection of the diaphragm 16 and force it against the spikes 40, which will puncture the diaphragm and thus release the high pressure gas to the atmosphere and prevent an explosion of the regulator. For convenience in adjusting the screw 23 to produce the desired low pressure of the gas, a gauge 43 may be mounted on one side of the casing section 10 so as to register the pressure within the casing.

Having thus described my invention, what I claim is:

In pressure regulating devices, the combination of a casing having a boss at one end thereof, a flexible diaphragm in said casing dividing the interior thereof into two chambers, a high pressure supply conduit extending into one of said chambers and provided with a valve seat at its end, a flexible member secured interiorly to said casing, a valve carrying member adapted to contain a valve, and arranged between and secured to said diaphragm and said flexible member and solely supported and guided thereby, said valve carrying member having a tubular exteriorly threaded extension extending through the flexible member and provided with a threaded bore substantially in alignment with the valve seat, a valve adjustably arranged in said bore, a flanged nut adapted to be screwed upon the exterior of said tubular extension to clamp the flexible member between the nut and said valve carrying member, and a coiled spring arranged between said tubular extension and the said boss and having its opposite ends seated around said flange nut and said boss, said boss being provided with a bore in alignment with the bore in the tubular extension adapted to receive a closing plug whereby the valve may be adjusted when said plug is removed.

In testimony whereof, I hereunto affix my signature.

AUGUST E. SLINGER.